United States Patent
Ozzie et al.

(10) Patent No.: US 8,266,292 B2
(45) Date of Patent: Sep. 11, 2012

(54) MEMORABLE RESOURCE NAMES

(75) Inventors: Raymond E. Ozzie, Seattle, WA (US);
Eric M. Patey, Rockport, MA (US);
Brian M. Lambert, Boston, MA (US);
George P. Moromisato, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/819,268

(22) Filed: Jun. 21, 2010

(65) Prior Publication Data
US 2011/0314156 A1    Dec. 22, 2011

(51) Int. Cl.
*G06F 15/173* (2006.01)
(52) U.S. Cl. ........................ 709/226; 709/223
(58) Field of Classification Search .............. 709/203, 709/204, 212, 213, 217, 219, 223, 225, 226, 709/227
See application file for complete search history.

(56) References Cited

U.S. PATENT DOCUMENTS

| | | | |
|---|---|---|---|
| 7,458,096 B2 * | 11/2008 | Knouse et al. ................. | 726/8 |
| 2002/0078069 A1 | 6/2002 | Moore | |
| 2004/0252198 A1 | 12/2004 | Hatanaka | |
| 2006/0173937 A1 | 8/2006 | Sia et al. | |
| 2008/0133512 A1 | 6/2008 | Myhre et al. | |
| 2009/0276396 A1 | 11/2009 | Gorman et al. | |
| 2010/0250701 A1* | 9/2010 | Harvell et al. ................. | 709/217 |

FOREIGN PATENT DOCUMENTS
WO    2010010430 A2    1/2010

OTHER PUBLICATIONS

Reed, Drummond "[OpenID] Human-Memorable Namespaces (was RE: Identity Concepts Explained by Cartoon Ducks)"—Published Date: Jan. 6, 2008 http://www.cs.umass.edu/~emery/pubs/berger-asplos2000.pdf.
Hardcastle-Kille, S.E. "A String Representation of Distinguished Names"—Published Date: Oct. 1992 http://tools.ietf.org/html/draft-ietf-osids-distnames-04.
Paskin, Norman, "Toward Unique Identifiers"—Published Date: Mar. 18, 1998 http://www.ieee.org/portal/cms_docs/pubs/proceedings/proc071999.pdf.
Sun, Sam X., "Internationalization of the Handle System"—A Persistent Global Name Service—Published Date: Apr. 1998, http://www.cnri.reston.va.us/unicode-paper.ps.
Cselle, Gabor, "Organizing Email"—Published Date: Oct. 3, 2006 http://dcg.ethz.ch/theses/ss06/organizing_email_report.pdf.
Stiegler, Marc, "An Introduction to Petname Systems"—Published Date: Feb. 2005 http://www.skyhunter.com/marcs/petnames/IntroPetNames.html.
"International Search Report and Written Opinion" cited in related PCT Application No. PCT/US2011/040227 mailed Feb. 9, 2012.

* cited by examiner

*Primary Examiner* — Ario Etienne
*Assistant Examiner* — Sargon Nano
(74) *Attorney, Agent, or Firm* — Microsoft Corporation

(57) ABSTRACT

Among other things, one or more techniques and/or systems are disclosed for generating a human memorable resource name. Both a first part of the resource name and a second part of the resource name are generated, where both parts respectively comprise a memorable alphanumeric string (e.g., easily remembered). The first and second parts of the resource name are combined with an intervening separator symbol to generate the first resource name, comprising the first part, the symbol, and the second part. The first resource name is compared against a desired threshold to determine if it can be used as the name for the resource. If the first resource name does not meet the threshold a second resource name is generated for the resource.

20 Claims, 6 Drawing Sheets

MEMORABLE RESOURCE NAMES

BACKGROUND

Collaborative environments exist and are created to enable users to collaborate on and share a common resource. For example, a document can be saved to a shared data store, such as on an enterprise's distributed data storage and management system, and those users having appropriate authorization can edit, add to and/or update the share resource. Further, users often collaborate and share a resource, such as web-based document or set of documents, online (e.g., accessed using the Internet). As an example, online information centers (e.g., electronic encyclopedias, such as wiki type pages) comprise articles that practically anyone can access, read, and edit).

Further, in order to access a particular article, such as for "Florence, Massachusetts," those who wish to read or write about the subject can visit that resource. Within online information center, the article name "Florence, Massachusetts" may be both globally unique (e.g., only resource having that name) and human-memorable (e.g., easy to remember for a user). That name, for example, may be all that is needed by a user to find and access that particular article among millions of articles present in the online information center.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Often, collaboration may involve a resource that is created ad hoc, and the resource may not have a common, well-defined name. For example, a first user in an enterprise may wish to write meeting notes for today's 3 PM meeting with the marketing team. The first user can save the meeting notes as "Marketing Meeting Notes" or as "George's Notes on Marketing Meeting" or as "Meeting-Marketing-Jun7". In this example, in order for a second user to find the meeting notes, the first user must communicate the resource name to those interested (e.g., second user). The first user could email the name to the second user, but if collaborating over the phone and/or the first user does not have the second user's email address, it may be problematic. Further, if the meeting comprised a significant number of people, it can be time consuming. Instead, the first user may wish to merely state, "go to 'Marketing Meeting Notes' and start editing" to the assembled meeting.

Accordingly, among other things, one or more techniques and/or systems are disclosed generating names for resources that are globally unique, such as to the collaboration environment (e.g., within a desired time period). Further, the resource names can have easily recognizable (e.g., human memorable) patterns that may be associated with the collaboration platform (e.g., the string, "(978) 555-1212" is easily recognizable as a phone number because of its pattern). Additionally, the resource names can comprise a minimum number of mnemonic tokens (e.g., for remembering, such as a memorable date (1776)), and can be easily communicated verbally and/or textually.

In one embodiment for generating a human memorable resource name, a first part of the resource name comprising a first memorable alphanumeric string (e.g., easily remembered), is generated; and a second part of the resource name comprising a second memorable alphanumeric string, is generated. The first and second parts of the resource name are combined with a separator symbol (e.g., between the first and second part) in order to generate the first resource name. A determination is made to see if the first resource name meets a desired threshold (e.g., is particular to merely one resource in the collaboration environment). If it meets the threshold, it is can be used for the resource, otherwise a second resource name is generated (e.g., until a name is generated that meets the desired threshold).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
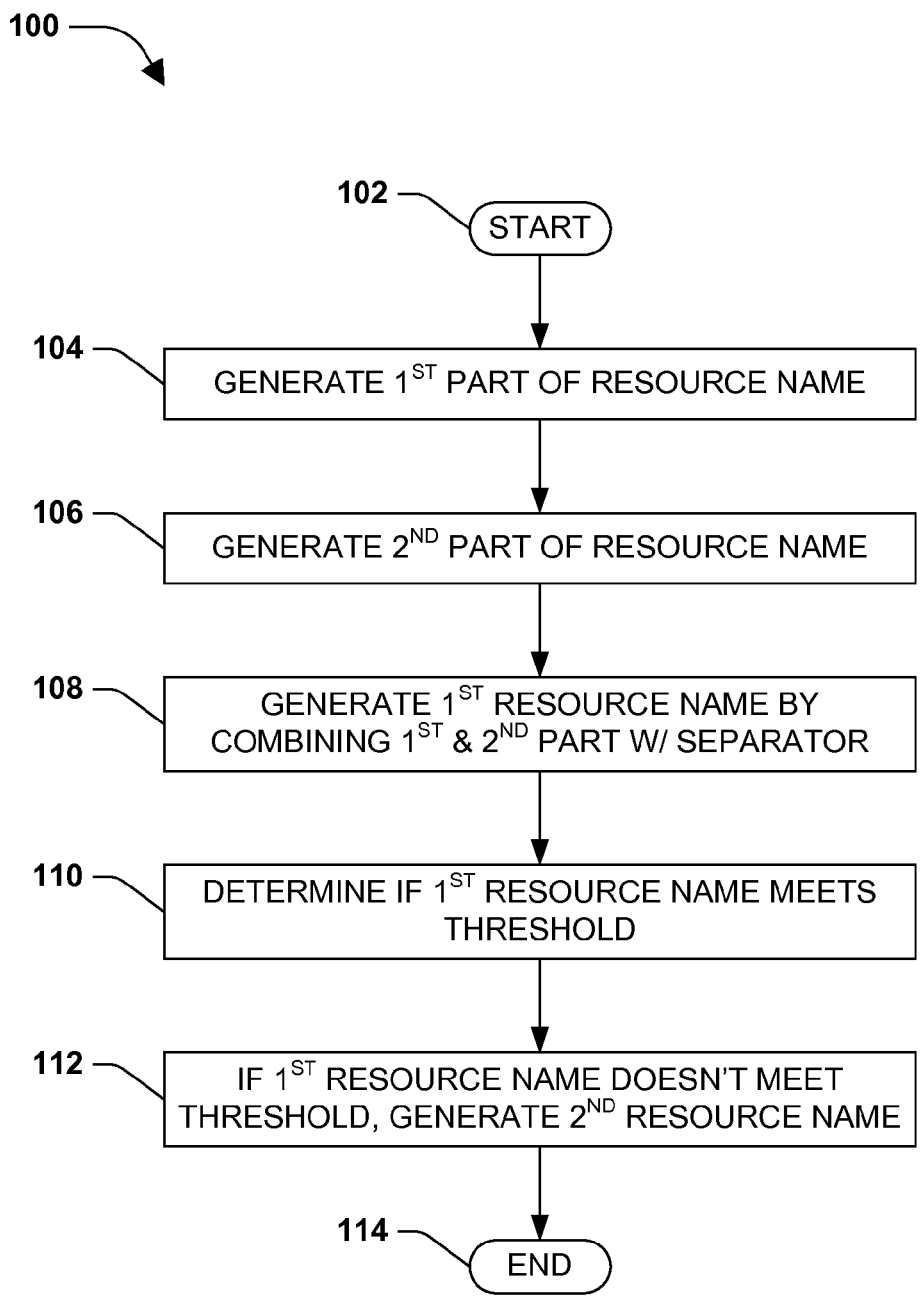
FIG. 1 is a flow diagram of an exemplary method for generating a human memorable resource name.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for generating a human memorable resource name. The exemplary method begins at 102 and involves generating a first part of the resource name, where the first part is a first memorable alphanumeric string, at 104. At 106, a second part of the resource name is generated comprising a second memorable alphanumeric string. For example, in order to generate a human memorable resource name, respective parts of the name should be memorable.

A random sequence of letters and/or numbers (randomly sequenced alphanumeric string) is typically not memorable. Alphanumeric strings become memorable when associated with something memorable, such as a name, date, time, email address, username, and/or a combination of memorable things, for example. For example, Joe Smith may create a file on a shared data store comprising meeting notes from a recent meeting, on which those in the meeting can collaborate to edit. In this example, a first part may comprise the string "jsmith," which is the username of the owner/creator of the resource; and the second string may comprise "7jun10," which is a date the meeting was held, and/or the resource was created.

In one embodiment, a memorable alphanumeric string may comprise a text string, such as a word from a dictionary. In this embodiment, different cultures may influence a language choice for using a text string, because foreign or non-native words may not be as memorable as words from a local language. Typically, dictionary words are easily remembered, for example, as long as they are short and simple. As an example, simple words such as "mountain," "yellow," "zebra," "scary," and others may be used.

At 108 in the exemplary method 100, the first part and the second part are combined by introducing an intervening separator symbol in order to produce a first resource name. In one embodiment, the '+' is the ASCII character 0x2B (plus sign) can be used as a separator symbol (or combining symbol). For example, the first part "jsmith" can be combined with the second part "7jun10" to produce the first resource name "jsmith+7jun10. It may be appreciated that '+' has some desirable characteristics for use as a separator symbol. For example, it can be easily entered by various devices (e.g., phones, etc); it is a valid URL segment character (e.g., as opposed to other characters such as '&' and '?'); it is not confused in English punctuation or pronunciation (e.g., as opposed to '-', '/', ('dash' vs. 'slash'), etc.); and it is visually appropriate (e.g., as opposed to '^') for example. In another embodiment, a different separator symbol may be used, such as the '&', the ASCII character 0x26 (ampersand). It will be appreciated that the separator symbol (or combiner) is not limited to any particular embodiment merely that it provides a way to combine the first and second parts to produce a first resource name. In another embodiment, the intervening separator symbol may be omitted (in this method and/or in one or more techniques and/or systems provided herein), such as where the first part and/or the second part are sufficiently unique, for example. In one embodiment, the separator symbol may technically be present but may merely comprise a space or the absence of a character such that merely the first part and the second part (and any other parts as discussed below) are visible/discernable.

At 110, a determination is made on whether the first resource name meets a desired threshold. In one embodiment, the desired threshold can facilitate determining whether the first resource name is particular to merely the intended resource for which it was created. For example, within a collaborative environment (e.g., enterprise data store, Internet, intranet, etc.) a name for a resource can be particular to merely that resource (e.g., unique within the collaborative environment). In this embodiment, the desired threshold can comprise a determination factor that identifies whether the first resource name is not in a database of existing resource names. That is, for example, determining whether the first resource name is already being used to identify a different resource in the collaborative environment.

At 112, if the first resource name does not meet the desired threshold, a second resource name is generated for the resource. In one embodiment, the second resource name can be generated in a same way as the first resource name. For example, a first and second part of the second resource name can be generated, where the first and second part are memorable alphanumeric strings; and they can be combined using a separator symbol (e.g., the '+' sign). Further, in one embodiment, it can be determined whether the second resource name meets the desired threshold; and, if not, another resource name can be generated until the desired threshold is met (e.g., by looping back to 102). Additionally, it will be appreciated that while two parts (e.g., first part and second part) are combined with an intervening separator symbol, that one or more additional parts and linked with a corresponding number of separator symbols to generate a resource name (e.g. a candidate resource name that is designated as the resource name if a desired threshold is met).

Having generated a human memorable resource name, the exemplary method 100 ends at 114.

Figure 2:
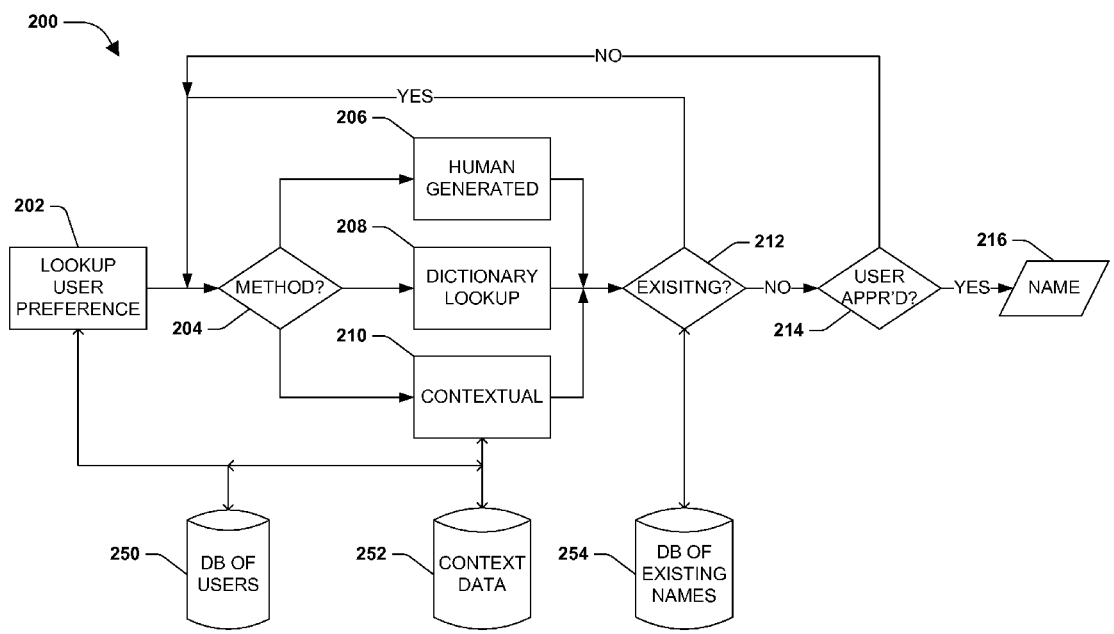
FIG. 2 is a flow diagram illustrating one embodiment of one or more portions of a method where a human memorable resource name is generated.

FIG. 2 is a flow diagram illustrating one embodiment 200 of one or more portions of a method where a human memorable resource name is generated. At 202, user preferences for resource naming can be identified. For example, resource names can be generated in a variety of ways, and in combinations of ways. In one embodiment, the first part and/or the second part of the resource name can be created using a user generated alphanumeric string. That is, for example, the user (e.g., a person) can select a word or combination of letters and numbers that are memorable to the user.

In another embodiment, the first part and/or the second part of the resource name can be created by having a processor randomly select an alphanumeric string from a dictionary stored in memory. As an example, the first part may be selected from a first dictionary, and the second part can be selected from the first dictionary or may be selected from a second dictionary. In one embodiment, the dictionary may not be a complete English language (e.g., or some other language) dictionary; there may be good reasons for eliminating entire classes of words (e.g., words that are hard to spell, objectionable words, etc.). Further, in this example, sets of words may be blocked for particular word combinations, such as those that may be objectionable or have unintended meanings.

In another embodiment, an alphanumeric string can be generated from contextual information that is associated with the resource. Contextual information associated with the resource can comprise a time the resource was created, or something associated with the resource occurred (e.g., the meeting time), for example. Further, contextual information may comprise a location associated with the resource, such as a city, building, room name/number, etc., which may help identify the resource (e.g., location of creator, where the resource is located, why it was created, etc.). Additionally, the contextual information can comprise a system associated with the resource, such as a server location, domain, database, and/or some component associated with the resource. The contextual information may also comprise a username (or email address, or person's name) associated with the resource, for example.

In FIG. 2, when looking up user preferences, at 202, a database of users 250 may be called to identify potential usernames or authorizations for resource naming. Further, contextual information may be comprised in a database 252 that identifies a time of resource creation, location information, system information, and/or other contextual information related to the resource. At 204, the method used to generate a first and second part is determined.

For example, in order to generate the first and second part of the first resource name a same method may be used for both, or a different method may be used for the first than for the second. In one embodiment, the first part of the first resource name can be generated by the user, at 206, such as by having the user enter a memorable alphanumeric string. Alternately, the first part may be generated by randomly selecting a word from a dictionary, such as stored in memory, at 208. Alternately, the first part may be generated (e.g., automatically) by selecting some contextual information for the resource, at 210.

As an example, an enterprise may have a custom dictionary that can be used to generate parts of the resource name. In this example, the custom dictionary may comprise domain-specific words that can be provided to generate memorable strings for users of the enterprise's collaborative environment. In this way, in this example, the resource names can comprise a first part that may be quickly recognized as being associated with the particular enterprise, and, within the enterprise, can be quickly associated with a particular domain.

Further, the second part of the first resource name can be generated by the user, at 206, by selecting from a dictionary, at 208, or using contextual information. As an example, the second part may be generated using the custom dictionary, as described above. Further, as an example, the user may generate the first part of the resource name, by entering a user created alphanumeric string, at 206, and the second part can be generated by randomly selecting an alphanumeric string from a dictionary, at 208; or can be generated using contextual information associated with the resource, at 210.

In one embodiment, the first and second parts can be generated by the user, at 206. In another embodiment, the first and second parts can be generated by randomly selecting respective parts from a dictionary (e.g., either a same or different dictionaries). In another embodiment, the first and second parts may be generated from contextual information. In yet another embodiment, a first part may be generated using one of the methods 206, 208, 210, and the second part may be generated using a different method 206, 208, 210. Further, the first and second parts are combined using a separator symbol (e.g., '+').

As an illustrative example, two words can be randomly selected out of a dictionary, one for the first part and a different one for the second part. Alternately, two dictionaries can be used, a first dictionary for the first part and a second dictionary for the second part. For example, the first dictionary might be a list of adjectives and the second dictionary might be a list of animals. In this example, when combined, they can form a noun-phrase that may be both easy to remember and that is typically innocuous. (e.g., purple+zebra, scary+vole, unwanted+yak).

As another illustrative example, contextual information can be used to generate one or both of the parts. For example, the first part may be generated from the username of the resource creator and the second part can be selected randomly (e.g., jmiller+blue, marym+jacket, sophie78+opinion). As another example, a current date-time may be used for the second part (e.g., jmiller+9Feb10, marym+3PMTuesday9, sophie78+3PMFeb9). In this embodiment, a context may be more memorable; and using a date can be useful for short-lived resources. For example, if a resource merely lasts for a month or less, then a string of the form dayMonth without year or time may be sufficient.

As another example, a user supplied prefix may allow the user to choose the first part as a persistent preference. For example, John Miller might choose the alphanumeric string "MSRJohn" as his desired string. In this example, whenever John creates a new resource, random resource names can be generated where the first part is "MSRJohn" and the second part is a random selection from a dictionary or contextual (e.g., MSRJohn+blue, MSRJohn+9Feb10, and MSRJohn+yak).

As another example, a geographic location can be used for one of the parts of the resource name to make the resource name more memorable. For example, a current geographic location of the resource creator can be used to seed one of the strings, and another method can be used to select the other part of the resource name (e.g., 17 ParkPlace+green, 1CherryLane+circular, and BakerSt223B+pensive). For enterprise settings (e.g., particularly if resources are associated with meetings), for example, it may be useful to use building and/or room information (e.g., 1175Building36+yellow, ConferenceB+Atlantic, and RedWC+gentle).

In one embodiment, the first part of the resource name and/or the second part of the resource name can comprise an alphanumeric string that has a minimal number of mnemonic tokens. For example, if the parts of the resource name can comprise a minimum number of mnemonic tokens they may be more human memorable. For example, memorizing a number '6356' means a user may have to remember four tokens because it has four digits; however, memorizing a number 1776 may be easier because the user may remember it as a single token, the year of US independence. Therefore, in this embodiment, for example, the one or more dictionaries used can be comprised of alphanumeric strings having fewer tokens, and/or, an automated generator of the parts of the resource name can merely generate parts having a desired number of tokens (e.g., one).

At 212, a check can be performed to determine if the resulting first resource name currently exists in a database of existing names 254. For example, the combination of the first part, the separator, and second part are compared against resource names already existing in the database, such as may be in use in a collaboration environment. If the resource name already exists (YES at 212), a new first part and/or a new second part can be generated for the resource, to generate a new or second resource name.

In one embodiment, if the first resource name does not match an existing name in the database 254 (NO at 212), the first resource name can be temporarily reserved, such as for a small period of time (e.g., 1 hour), for the intended resource. For example, in order to mitigate offering of the first resource name to a second user while a first user is deciding whether to accept the first resource name, the first resource name can be reserved for a desired time-out period. In this way, in this example, the first resource name is not permanently reserved, merely for the time-out period. Further, in this embodiment, if the user accepts the first resource name before the time-out period, the reservation of the first resource name can be cancelled.

Further, in one embodiment, the first resource name that can be presented to a user for preference selection (e.g., on a coupled display screen). In this way, for example, the user can determine whether they wish to keep the first resource name (YES at 214), or prefer to find another name for the intended resource (NO at 214). In this embodiment, if the user does not select the first resource name as a desired selection, a second resource name can be generated by generating a new first part and/or a new second part. It will be appreciated that iterations can occur until an acceptable resource name is generated.

After the resource name 216 (e.g., either a first resource name or a second resource name, not to be confused with a first part or a second part of a resource name) is approved for use for the resource, the resource name can be associated with the resource, such as by indexing it to the resource in the database 254. It will be appreciated that any resource name (e.g. $7^{th}$ resource name, Nth resource name) can be associated with the resource, depending upon the number of iterations needed to arrive at an acceptable resource name. Further, in one embodiment, an expiration time period can be assigned to the first or second resource name. In this embodiment, for example, the resource may be available for merely a desired period of time (e.g., for collaboration access), and the expiration time period can provide for discontinuing access in the collaboration environment upon expiration.

It will also be appreciated that while a first part and a second part that are combined with an intervening separator symbol are described in generating the resource name, that one or more additional parts that are joined with a corresponding number of additional separator symbols may be used to generate the resource name (e.g. a candidate resource name that is designated as the resource name if a desired threshold is met). That is, in one aspect, the resource name may comprise more than two resource name parts (e.g., along with more than one separator symbol). In one embodiment, a first resource name may initially comprise two name parts with an intervening separator symbol, and it may be determined not to meet the desired threshold and/or is an existing resource name (e.g., at 110 of FIG. 1, or 212 of FIG. 2). In this embodiment, for example, instead of returning to generating a new first and second part for the first resource name, a third part can be generated, along with an intervening second separator symbol, such as between the second and third part (e.g., jsmith+jun7+marketing), to create a second resource name.

Further, in this embodiment, it can be determined whether the second resource name comprising the three parts and two separator symbols, for example, meets the desired threshold (e.g., are not contained in a list of existing resource names). In one embodiment, if the second resource name does not meet the desired threshold, a new set of first, second, and third parts can be generated to be combined for a third resource name. Alternatively, in another embodiment, a fourth resource name part may be generated and combined with the three other parts using a third separator symbol to create the third resource name. As an example, the resource name may comprise an arbitrary number of name parts, for example, along with an appropriate number of separator symbols, until it meets the desired threshold. Additionally, it will be appreciated that the name parts and separator symbols can be generated in accordance with the examples and embodiments described herein.

Figure 3:
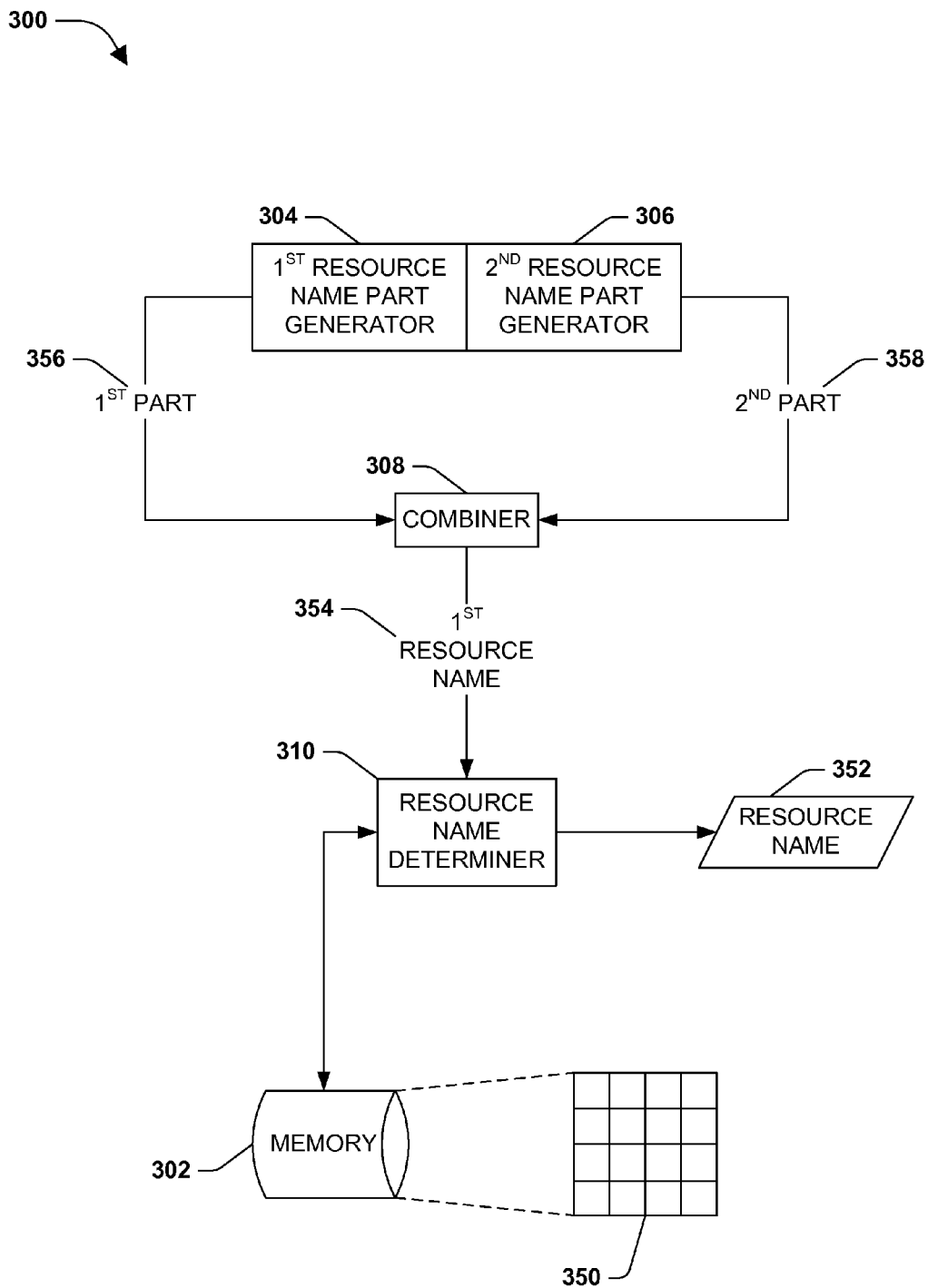
FIG. 3 is a component diagram of an exemplary system for generating a human memorable resource name.

A system may be devised that facilitates collaboration on a resource in a shared environment, for example, such as an enterprise data store, the Internet, or some other collaborative environment where a human memorable resource name is utilized. FIG. 3 is a component diagram of an exemplary system 300 for generating a human memorable resource name. A memory component 302 stores one or more threshold components 350 that are used to determine if a desired threshold is met for a resource name 354.

A first resource name part generation component 304 generates a first part 356 of the resource name 354 by generating a first memorable alphanumeric string (e.g., word, name, date/time, location, username, etc.). A second resource name part generation component 306 generates a second part 358 of the resource name by generating a second memorable alphanumeric string.

A combining component 308 is operably coupled with the first resource name part generation component 304 and the second resource name part generation component 306, to combine the first part 356 and the second part 358 with an intervening separator symbol to produce a first resource name 354. For example, a username "Ijames" can be combined with the '+' symbol and a randomly chosen word from a dictionary "king," to produce a first resource name "Ijames+king."

A resource name determination component 310 is operably coupled with the combining component 308 and the memory component 302, to determine if the first resource name 354 meets a desired threshold. The resource name determination component 310 compares the first resource name 354 against the one or more threshold components 350 to determine if a desired threshold is met. For example, if the first resource name 354 meets a desired threshold, the first resource name is assigned as the resources name 352 (e.g., in a database, such as stored in memory component 302), as the first resource name up to this point is merely a candidate for the resource name. Otherwise, in this embodiment, a second resource name can be generated and checked to see if it meets a desired threshold. This can be iterated until a suitable resource name is determined for the resource.

Figure 4:
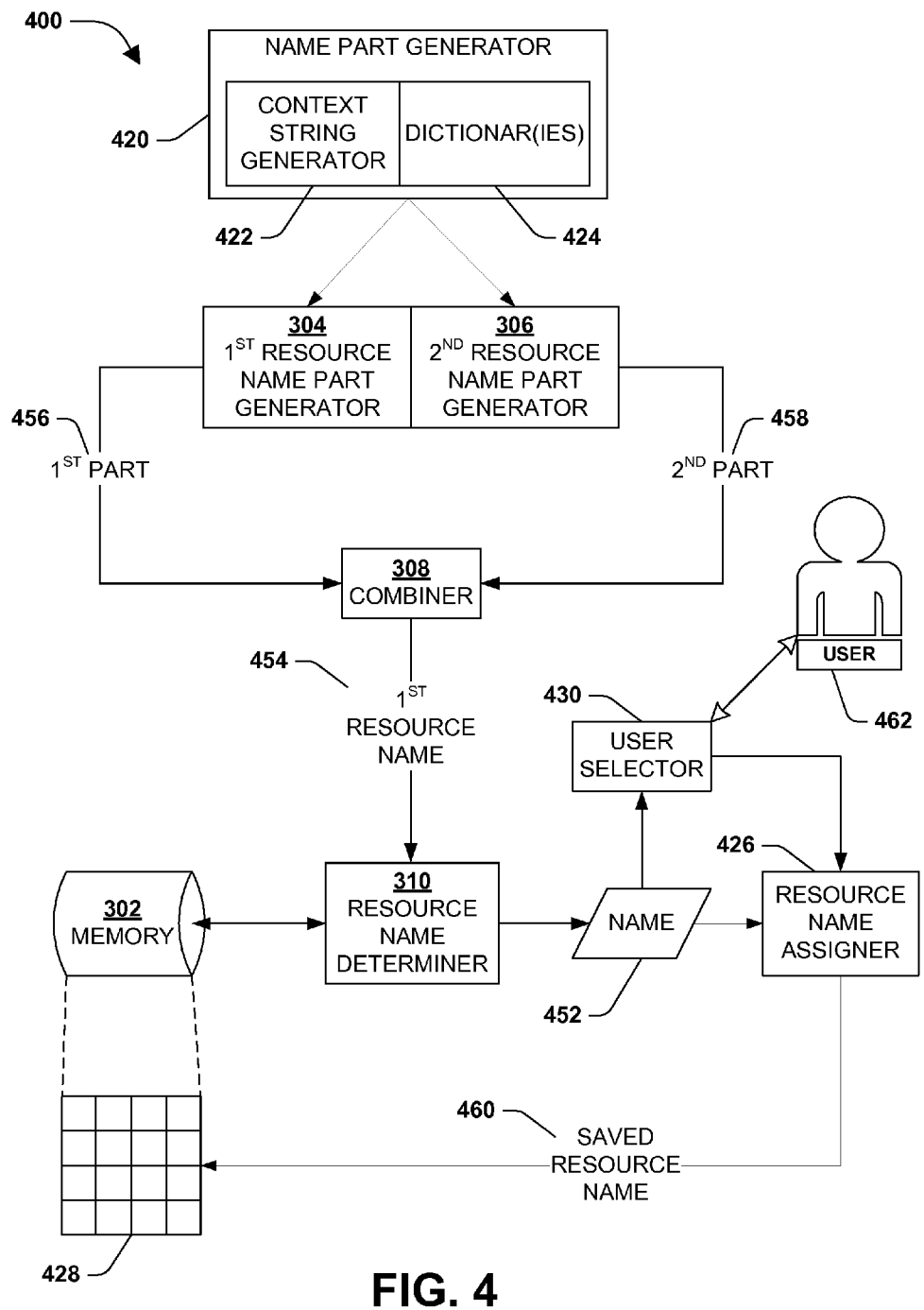
FIG. 4 is a component diagram illustrating an example embodiment where one or more techniques and/or systems, described herein, can be implemented.

FIG. 4 is a component diagram illustrating an example embodiment 400 where one or more systems, described herein, can be implemented. In this embodiment, the one or more threshold components 428 used to determine if a desired threshold is met for a resource name (e.g., first resource name 454) can comprise one or more databases of existing resource names (e.g., existing in the collaborative environment). For example, one more of the databases can be used as a threshold component, to determine whether the first resource (e.g., and any subsequent resource names generated) are already in use in the collaborative environment.

A resource name assignment component 426 can be configured to assign the first resource name 452 (e.g., or any subsequent resource names generated) to its associated resource, if it meets the desired threshold. Further, if the first resource name 452 is assigned to the resource, the resource name assignment component 426 can be configured to assign an expiration time period to the first resource name 452. Additionally, the resource name assignment component 426 can be configured to save the first resource name as a saved resource name 460 in a database of existing resource names, which can be comprised in the memory component 302.

A name part generation component 420 is operably coupled to the first resource name part generation component 304 and the second resource name part generation component 306, and the name part generation component 420 can be configured to automatically (e.g., programmatically) generate a memorable alphanumeric string for a part of the resource name. For example, the name part generation component 420 can automatically generate a string for the first 456 and/or the second 458 part or the resource name.

One or more dictionaries 424, having memorable alphanumeric strings, can be used by the name part generation component 420 for the automatic selection of memorable alphanumeric strings, such as for the first 456 and/or second 458 parts. A contextual string generation component 422 can generate an alphanumeric string from contextual information (e.g., which may be stored in the collaborative environment, and/or in memory component 302) that is associated with the resource. The contextual string generation component 422 can be used by the name part generation component 420 to automatically generate memorable alphanumeric strings.

A user selection component 430 is operably coupled with the resource name determination component 310 and used to present the first resource name 452 that meets the desired threshold to a user 462 for preference selection. That is, for example, if the first resource name (e.g., or any subsequent resource names generated) meet the desired threshold (e.g., do not already exist) it can be presented to the user 462 to allow the user to decide whether to use the first resource name as an actual name for the resource.

Figure 5:
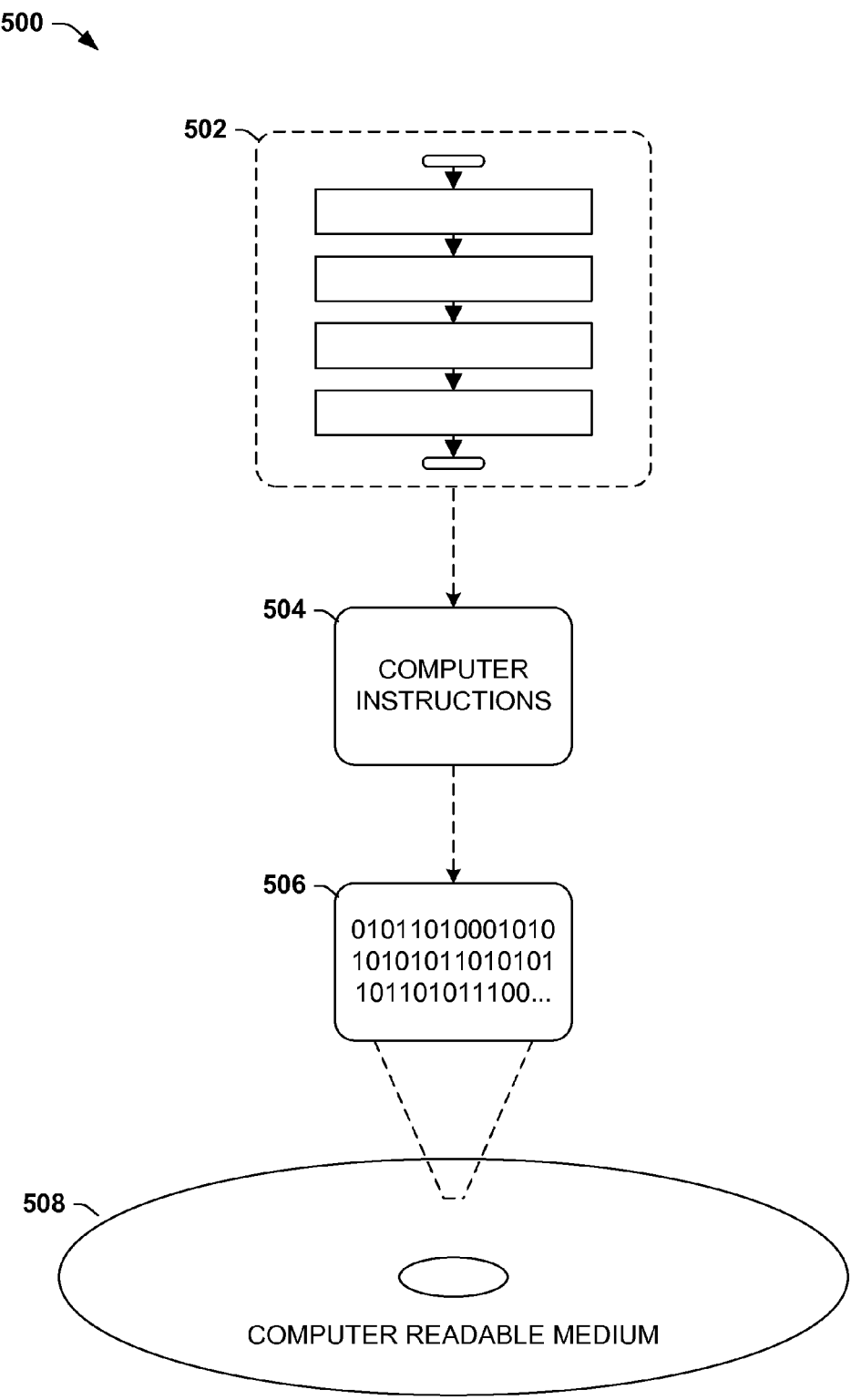
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as the exemplary method 100 of FIG. 1, for example. In another such embodiment, the processor-executable instructions 504 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
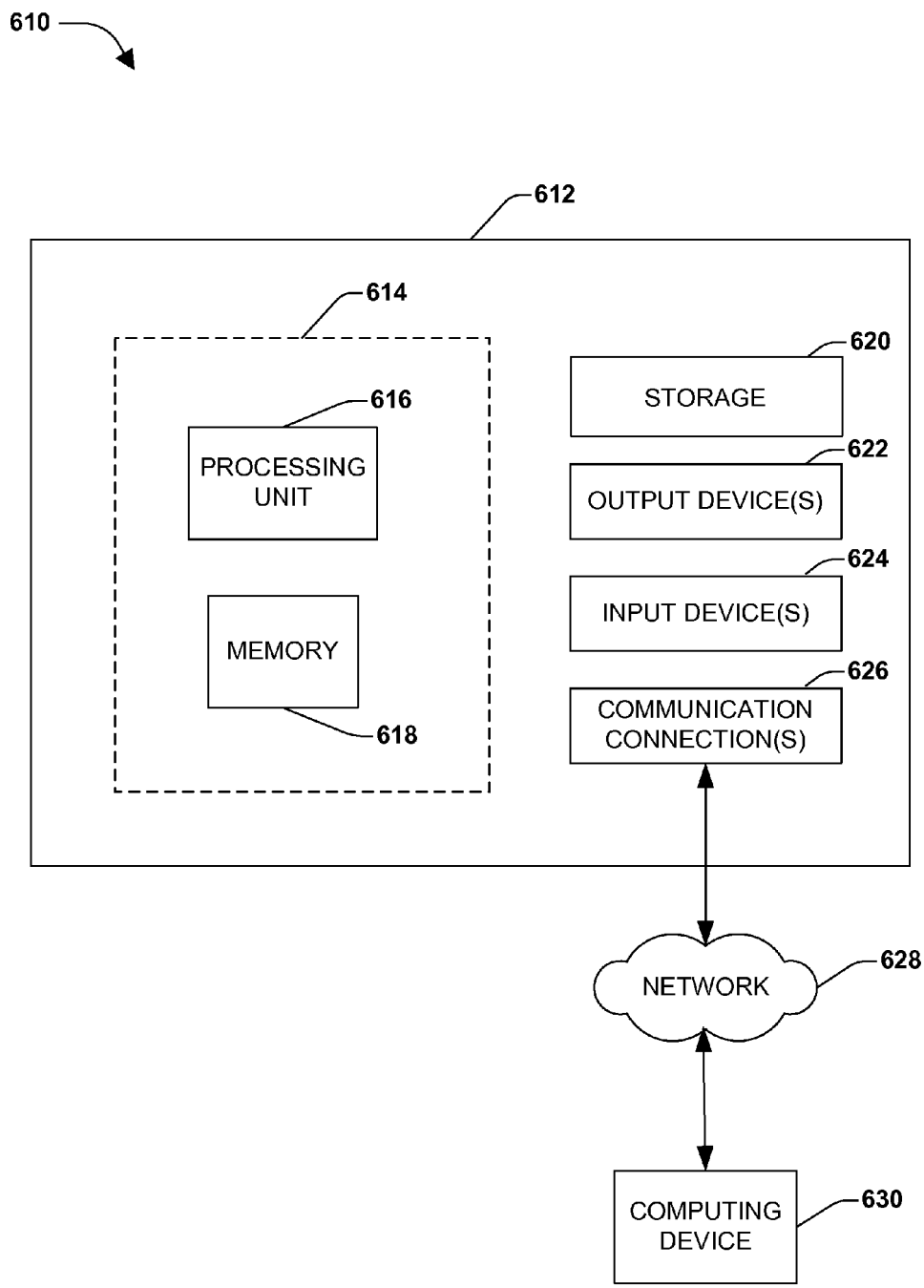
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for generating a resource name for a resource, comprising:
    generating a first part of the resource name comprising generating a first alphanumeric string that comprises a minimal number of mnemonic tokens, comprising one of:
        using a first user generated alphanumeric string;
        using a first processor to randomly select the first alphanumeric string from a first dictionary stored in computer-based memory; and
        generating the first alphanumeric string from first contextual information associated with the resource;
    generating a second part of the resource name comprising a second alphanumeric string that comprises a minimal number of mnemonic tokens, comprising one of:
        using a second user generated alphanumeric string;
        using a second processor to randomly select the second alphanumeric string from a second dictionary stored in computer-based memory; and
        generating the second alphanumeric string from second contextual information associated with the resource;
    combining the first part and the second part with an intervening separator symbol to obtain a first resource name, using a computer-based processor;
    determining if the first resource name meets a desired threshold comprising determining that the first resource name is not comprised in a database of existing resource names, stored in computer-based memory;
    if the first resource name meets the desired threshold:
        assigning the first resource name to the resource;
        assigning an expiration time period to the first resource name;
        presenting the first resource name to a user for selection; and
        if the user does not select the first resource name, generating a second resource name; and
    if the first resource name does not meet the desired threshold, generating the second resource name.

2. The computer-based method of claim 1, comprising saving the first resource name in the database of existing resource names.

3. The computer-based method of claim 1, the first alphanumeric string comprising a memorable string.

4. The computer-based method of claim 1, the second alphanumeric string comprising a memorable string.

5. The computer-based method of claim 1, at least one of generating the first part of the resource name and generating the second part of the resource name comprising using one or more of:
    a time associated with the resource;
    a date associated with the resource;
    a name associated with the resource;
    a location associated with the resource;
    a system associated with the resource; and
    a username associated with the resource.

6. The computer-based method of claim 1, at least one of the first dictionary and the second dictionary corresponding to a language associated with the user.

7. The computer-based method of claim 1, the intervening separator symbol comprising a valid URL segment character.

8. The computer-based method of claim 1, comprising omitting the intervening separator symbol from the first resource name if a combination of the first part and the second part is determined to be sufficiently unique.

9. A computer readable device comprising instructions that when executed perform a method for generating a resource name for a resource, comprising:
- generating a first part of the resource name comprising
  - generating a first alphanumeric string that comprises a minimal number of mnemonic tokens, comprising one of:
    - using a first user generated alphanumeric string;
    - using a first processor to randomly select the first alphanumeric string from a first dictionary stored in computer-based memory; and
    - generating the first alphanumeric string from first contextual information associated with the resource;
- generating a second part of the resource name comprising a second alphanumeric string that comprises a minimal number of mnemonic tokens, comprising one of:
  - using a second user generated alphanumeric string;
  - using a second processor to randomly select the second alphanumeric string from a second dictionary stored in computer-based memory; and
  - generating the second alphanumeric string from second contextual information associated with the resource;
- combining the first part and the second part with an intervening separator symbol to obtain a first resource name;
- determining if the first resource name meets a desired threshold comprising determining that the first resource name is not comprised in a database of existing resource names;
- if the first resource name meets the desired threshold:
  - assigning the first resource name to the resource;
  - assigning an expiration time period to the first resource name;
  - presenting the first resource name to a user for selection; and
  - if the user does not select the first resource name, generating a second resource name; and
- if the first resource name does not meet the desired threshold, generating the second resource name.

10. The computer readable device of claim 9, the intervening separator symbol comprising at least one of +, &, ?, -, /, and ^.

11. The computer readable device of claim 9, the intervening separator symbol comprising a space.

12. The computer readable device of claim 9, the intervening separator symbol merely comprising an absence of a character.

13. The computer readable device of claim 9, the resource comprised in a collaborative environment.

14. The computer readable device of claim 9, the resource comprising a document.

15. The computer readable device of claim 9, the resource accessible via at least one of an intranet and the Internet.

16. A system, comprising:
- one or more processing units; and
- memory comprising instructions that when executed at least in part via at least some of the one or more processing units perform a method for generating a resource name for a resource, the method comprising:
  - generating a first part of the resource name comprising
    - generating a first alphanumeric string that comprises a minimal number of mnemonic tokens, comprising one of:
      - using a first user generated alphanumeric string;
      - using a first processor to randomly select the first alphanumeric string from a first dictionary stored in computer-based memory; and
      - generating the first alphanumeric string from first contextual information associated with the resource;
  - generating a second part of the resource name comprising a second alphanumeric string that comprises a minimal number of mnemonic tokens, comprising one of:
    - using a second user generated alphanumeric string;
    - using a second processor to randomly select the second alphanumeric string from a second dictionary stored in computer-based memory; and
    - generating the second alphanumeric string from second contextual information associated with the resource;
  - combining the first part and the second part with an intervening separator symbol to obtain a first resource name, using a computer-based processor;
  - determining if the first resource name meets a desired threshold comprising determining that the first resource name is not comprised in a database of existing resource names, stored in computer-based memory;
  - if the first resource name meets the desired threshold:
    - assigning the first resource name to the resource;
    - assigning an expiration time period to the first resource name;
    - presenting the first resource name to a user for selection; and
    - if the user does not select the first resource name, generating a second resource name; and
  - if the first resource name does not meet the desired threshold, generating the second resource name.

17. The system of claim 16, one or more users authorized to modify the resource.

18. The system of claim 16, the resource comprised in an online information center.

19. The system of claim 16, the resource at least one of comprising and comprised in a wiki page.

20. The system of claim 16, at least one of the first dictionary and the second dictionary comprising one or more domain-specific strings associated with an enterprise associated with the user.

* * * * *